United States Patent
Mostert et al.

(10) Patent No.: US 8,377,166 B2
(45) Date of Patent: Feb. 19, 2013

(54) REDUCTION OF METAL CHLORIDE

(75) Inventors: Philippus Jacobus Mostert, Senderwood (ZA); Adalbert Prior, Mader (AU)

(73) Assignee: Prior Engineering Services AG, Diepoldsau (CH)

( * ) Notice: Subject to any disclaimer, the term of this patent is extended or adjusted under 35 U.S.C. 154(b) by 184 days.

(21) Appl. No.: 12/747,242

(22) PCT Filed: Dec. 9, 2008

(86) PCT No.: PCT/ZA2008/000124
§ 371 (c)(1),
(2), (4) Date: Aug. 24, 2010

(87) PCT Pub. No.: WO2009/076684
PCT Pub. Date: Jun. 18, 2009

(65) Prior Publication Data
US 2010/0307291 A1 Dec. 9, 2010

(30) Foreign Application Priority Data
Dec. 10, 2007 (ZA) .................................. 2007/11234

(51) Int. Cl.
*B22F 9/22* (2006.01)
(52) U.S. Cl. .......................................... 75/363; 75/634
(58) Field of Classification Search ........................ None
See application file for complete search history.

(56) References Cited

U.S. PATENT DOCUMENTS

| 3,586,497 | A | | 6/1971 | Gravenor, et al. | |
|---|---|---|---|---|---|
| 4,039,324 | A | * | 8/1977 | Stephens et al. | 75/639 |
| 4,388,109 | A | | 6/1983 | Kunda | |
| 5,356,120 | A | * | 10/1994 | Konig et al. | 266/175 |
| 2007/0034053 | A1 | * | 2/2007 | Collins et al. | 75/369 |
| 2009/0139372 | A1 | * | 6/2009 | Yonehana et al. | 75/351 |

FOREIGN PATENT DOCUMENTS

| DE | 1 592 499 A1 | | 5/1972 |
|---|---|---|---|
| JP | 58-171506 A | * | 10/1983 |
| RU | 2 265 673 C1 | | 12/2005 |
| RU | 2005128024 A | | 3/2007 |
| WO | 2005/102569 A1 | | 11/2005 |

OTHER PUBLICATIONS

Y. Inaba, et al; "Preliminary Study on (CoPtCr/NiFe)-$SiO_2$ Hard/Soft-Stacked Perpendicular Recording Media", IEEE Transactions on Magnetics, vol. 41, No. 10, Oct. 2005, 3 pages.
A. Yu Dobin, et al; "Domain Wall Assisted Magnetic Recording", arXiv:cond-mat/0605368 v1, May 15, 2006, 3 pages.
D. Suess; "Multilayer Exchange Spring Media for Magnetic Recording", Applied Physics Letter, Jun. 3, 2006, 9 pages.

(Continued)

*Primary Examiner* — George Wyszomierski
(74) *Attorney, Agent, or Firm* — Ladas & Parry LLP

(57) ABSTRACT

A method of recovering silver from a silver chloride mixture in which hydrogen gas is passed through the mixture to produce a metal chloride hydride which is then heated to dissociate the metal and to release hydrogen chloride gas.

8 Claims, 1 Drawing Sheet

OTHER PUBLICATIONS

D. Suess, et al; "Exchange spring recording media for areal densities up to 10 Tbit/in$^2$", Journal of Magnetism and Magnetic Materials 291-291 (2005), pp. 551-554.

Dieter Suess; "Micromagnetics of Exchange Spring Media: Optimization and Limits", Submitted to Journal of Magnetism and Magnetic Materials, vol. 308, Issue 2, Jan. 2007, pp. 183-197.

D. Suess, et al; "Optimization of Exchange Spring Perpendicular Recording Media", Intermag Nagoya, Apr. 2005 magnet.atp.tuwien.ac.at; 18 pages.

Jian-Ping Wang, et al; "Composite media (dynamic tilted media) for magnetic recording", Applied Physics Letters 86, 142504 (2005) 6 pages.

Database EPODOC [Online] European Patent Office, The Hague, NL: XP002531312, abstract, of RU 2309998, published Nov. 10, 2007.

International Search Report: PCT/ZA2008/000124, mailed Jun. 19, 2009.

* cited by examiner

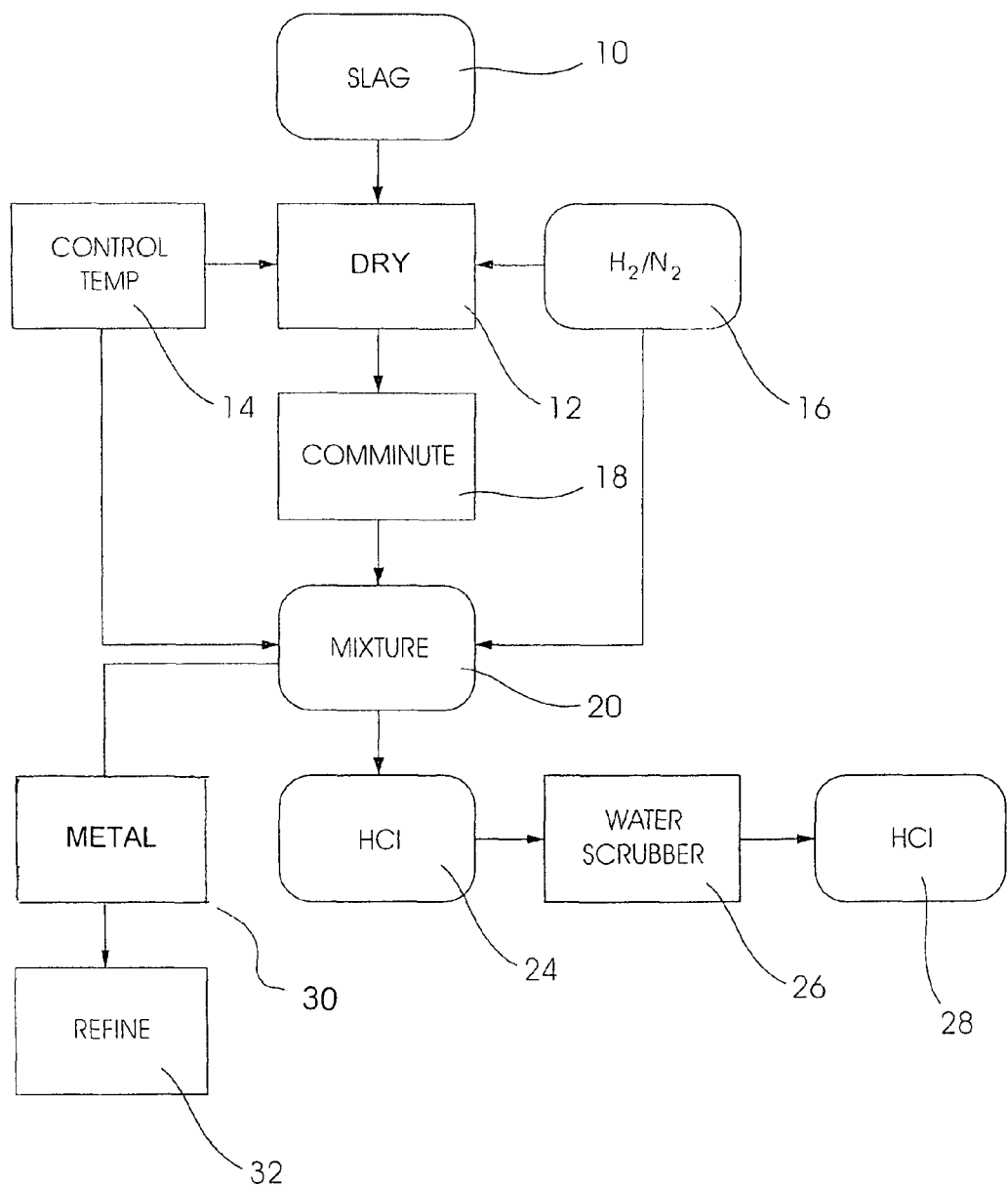

REDUCTION OF METAL CHLORIDE

BACKGROUND OF THE INVENTION

This invention relates to a method of recovering a metal from a metal chloride.

The invention is described hereinafter with particular reference to the recovery of silver from silver chloride. This application is however exemplary only and, where applicable, the principles of the invention can be used for the recovery of other metals such as gold and copper from their chlorides.

The miller process has been used in the refining of precious metals for a substantial period. Impurities contained in gold bullion are typically silver and base metals such as copper and nickel. Most of the impurities are removed for example by volatilization or are contained in the miller slag in the form of metal chlorides.

Normally the principal component of miller slag is AgCl with a lesser amount of $Cu_2Cl_2$. Minor amounts of Pb, Zn and Fe chlorides and sodium chloride also occur. AgCl production is also common in other precious metal refining operations used in the industry. However due to the limited, arduous, expensive and inefficient techniques which are available to convert AgCl to metallic silver, the presence of AgCl is normally regarded as undesirable.

Various techniques have been used to reduce AgCl to a metallic form.

These include the following:

AgCl in powder form, is reduced by placing the AgCl between iron plates, adding an aqueous acid solution to the AgCl and then steam heating the mixture for two to three days to produce a silver product. Extensive washing of the silver product is required before further refining takes place;

zinc dust is added to a silver chloride slurry in an acidified environment. The zinc powder is however expensive and, again, extensive washing is required before melting of the target metal can take place;

silver chloride is reduced using soda ash, soda ash plus borax or by the addition of carbon; and a technique described in U.S. Pat. No. 4,388,109 wherein silver chloride is mixed with sodium carbonate and heated to a temperature in excess of 500° C. to produce elemental silver and sodium chloride. Extensive washing is required before melting takes place.

It is an object of the present invention to provide an improved method for the recovery of silver wherein the metal chloride is directly reduced to metal using hydrogen gas and which is carried out at atmospheric or at a low pressure. A further object of the invention is to allow for the recovery of the hydrochloric acid gas which is evolved during the reduction process.

SUMMARY OF INVENTION

The invention provides a method of recovering metal from a particulate mixture which contains a metal chloride which includes the steps of:
(a) controlling the temperature of the particulate mixture,
(b) passing a gas which contains hydrogen through the particulate mixture for a predetermined time period to produce a metal chloride hydride, and
(c) raising the temperature of the particulate mixture to cause the metal chloride hydride to dissociate into the metal and to release hydrogen chloride gas.

The method may be preceded by a step of drying the mixture at a temperature of up to 100° C. in an atmosphere of the hydrogen-containing gas.

The method is preferably carried out at atmospheric pressure or at a pressure which does not differ substantially from atmospheric pressure.

The metal chloride mixture is preferably dried to a dryness of less than 0.1% $H_2O$. The drying process can lead to the production of lumps of the metal salt. If so these are comminuted using any suitable technique to produce a typical sand-sized dried product before carrying out step (b).

The heating and reduction steps are carried out in a crucible. The particulate mixture may form a mixed metal chloride bed in the crucible and, to ensure an even hydrogen gas distribution throughout the bed, gas distribution holes or passages may be formed into the bed.

In step (b) the predetermined time period may be at least four hours long. The temperature of the bed, during this phase, may be controlled to be between 70° C. and 80° C. In step (c) the temperature may be raised, preferably incrementally, initially to about 400° C. and thereafter to at least 600° C. Dissociation of the metal chloride hydride starts and as the temperature is increased to about 270° C. the dissociation proceeds rapidly, releasing HCl. The HCl gas which is soluble in water, is collected in a scrubber using a water collection system.

The hydrogen-containing gas preferably comprises $H_2/N_2$ of 50%/50% by volume mixture.

BRIEF DESCRIPTION OF THE DRAWING

The invention is further described by way of example with reference to the accompanying diagram which illustrates the method of the invention.

DESCRIPTION OF PREFERRED EMBODIMENT

The accompanying drawing illustrates the application of the method of the invention. A slag mixture 10, produced in a precious metal refining process and containing mixed metal chlorides, typically including in excess of 90% AgCl, is subjected to a drying step 12. The mixture is dried at a temperature of up to 100° C. using suitable control equipment 14, known in the art, in an atmosphere of $H_2/N_2$ (16) of 50%/50% by volume to a dryness of less than 0.1% $H_2O$. Any lumps of the metal salts which may form during the drying process are broken down in a comminution stage 18 to produce a sand-sized dried product 20 which is then charged into a crucible (not shown) in which the drying was carried out. The particulate mixture 20 forms a mixed metal chloride bed in the crucible. Passages or holes (not shown) are formed in the bed to ensure that an even hydrogen gas distribution can take place throughout the bed.

The gas 16 is then passed through the bed for a minimum of four hours at a temperature which is controlled by the apparatus 14 of between 70° C. and 80° C. During this time the hydrogen gas reacts with the metal chloride salts to form corresponding metal chloride hydrides.

After the four hour treatment phase the temperature of the bed inside the crucible is raised, using the equipment 14, preferably incrementally, to a temperature of 600° C. to 700° C. Dissociation of the metal chloride hydrides starts and as the temperature is increased to about 270° C. the dissociation proceeds rapidly, releasing HCl gas (24). This gas, which is soluble in water, is collected in a gas scrubber 26 using an appropriate water collection system as liquid hydrochloric acid 28 which is then available for industrial use or commercial disposal.

Metal 30 produced in the aforementioned process can then be further refined in a step 32 before disposing thereof.

Without being bound by the following explanation the applicant believes that AgCl forms ionic crystals with defects of the Schottky or Frenkel type which yield an enthalpy and entropy for the formation of a dominant defect pair. It is difficult to quantify the contribution from each parameter due to the intrinsic region of temperature and the defect concentration which exists in the bulk of the crystal formation. In respect of the total free energy of the complete pair one component of the defect cannot be created without creating the other charge compensating component. This system may result in pair formation free energy. Hence the enthalpy and entropy may be further resolved into the formation of the enthalpies and entropies of individual defect points of a particular crystal structure.

These effects result in superionic conductivity which provides a facility to incorporate atoms of hydrogen into the crystal structure due to local surcharges of electrons replacing flexible silver atoms by protons which are temporarily bonded. This bonding mechanism only occurs at temperatures below 150° C.

The preceding theoretical explanation which is speculatively advanced does however offer an explanation of the effect of working at the different temperatures. Thus, at a temperature below 150° C. and preferably in the region of from 70° C. to 80° C., the mixed metal chlorides, of which the major component is silver chloride, are able to load hydrogen atoms onto the charged surfaces of the crystals and, by subsequently raising the temperature to about 270° C., the dissociation of the hydrided metal chlorides commences with the evolution of HCl gas. When the temperature is further raised initially to about 400° C. and thereafter to about 700° C. the molecular system which is formed is completely dissociated.

During the collapse of the crystal structure the hydrogen atoms are located sufficiently close to the chlorine atoms within the crystal system and this, together with a greater chemical affinity of chlorine atoms for hydrogen atoms, as opposed to the affinity of the chlorine atoms for the existing silver atoms, results in the formation of the more stable HCl molecule, above 150° C., which is liberated as HCl gas.

The combination of these process steps results in the hydrogen reduction of silver chloride, to silver metal, with the liberation of HCl gas which readily dissolves in water to produce a hydrochloric acid solution which is available for industrial use. If all of the hydrochloric acid gas which is evolved is collected then the process is pollution free.

Laboratory Pilot Plant Test Results
Thermal Gravimetric Analysis (TGA) Results of the Process Five TGA tests were done on a sample of granulated miller slag from which the copper chloride had been leached using the method described by G Stanley; "The extractive metallurgy of gold in South Africa" SAIMM Publication—1987 Pages 630 to 633.

TGA test conditions were:

| Amount of sample | 20-30 mg |
| Gas flow | 100 ml/min |
| Gas composition | $H_2/N_2 = 1/1$ |

| Heating/temperature profile | From 30° to 400° C. @ 5° C./min Isotherm STFP @ 400° C. - 120 mins |
| Reaction | AgCl + ½$H_2$ → Ag + HCl |
| Theoretical weight loss | AgCl to Ag = 24.76% |

| | Weight Loss-% | % of 24.76% |
|---|---|---|
| TEST 1 | After 25 mins - 1.11% | (Reduction Efficiency) |
| | After 45 mins - 0.94% | |
| | After 190 mins - 24.0% | 96.9% |
| TEST 2 | After 45 mins - 0.52% | |
| | After 190 mins - 21.90% | 88.4% |
| TEST 3 | After 35 mins - 0.72% | |
| | After 120 mins - 22.60% | 91.3% |
| TEST 4 | After 25 mins - 0.94% | |
| | After 45 mins - 0.96% | |
| | After 120 mins - 23.9% | 96.5% |
| TEST 5 | After 25 mins - 1.16% | |
| | After 45 mins - 1.87% | |
| | After 190 mins - 24.4% | 98.5% |

While the analyses indicate that the process could be highly efficient in reducing AgCl to Ag metal, the hydriding temperature range could not be accurately defined using TGA, due to the theoretical weight gain of only 0.7% on a very small sample of AgCl (i.e. a 0.00021 gram weight gain on a 0.03 gram sample). Also, as AgCl is hygroscopic, moisture loss made weight gain measurements extremely difficult.

An optimum hydriding temperature is below 150° C. and appears to be greater than 30° C.; possibly between 70° C. and 100° C. This optimum hydriding temperature is considered to be important and must be accurately controlled, over an adequate period of time and with sufficient hydrogen available, to ensure complete hydriding of the AgCl. Decomposition of the hydride formed, in turn, only requires an adequate temperature increase over a sufficient period of time.

Pilot Plant Test Results

In order to assess the effect of scale-up from the very small sample size (0.03 gram sample weight) used for the TGA tests, Calcimat Pilot Plant tests were completed using a much larger test sample weight of AgCl of about 500 grams.

Calcimat test work conditions, at atmospheric pressure, were:

| Amount of sample | 507 grams |
| Gas Flow | 0.25 l/min |
| Gas Composition | $H_2/N_2 = 50/50\%$ (vol/vol) |
| Specific Heating/temperature profile | 86/277/480° C. |
| Process time | 135 min/174 min/239 min |
| Outcome weight analysis | 252.5 grams |

Temperature was estimated inside the bed with a tolerance of app. 5° C.

Calcimat Pilot Plant Test Analyses

| | AgCl % | TOTAL Ag % | Au % | Cu % | TOTAL |
|---|---|---|---|---|---|
| Feed | 59.5 | 54.6 | 0.81 | 6.5 | |
| Lower Reactor Bed | 54.5 | 52.9 | 0.79 | 6.7 | |
| Upper Reactor Bed | 54.7 | 55.2 | 0.89 | 6.7 | |
| Product | Trace | 69.5 | 0.7 | 6.7 | |
| Product Melt | — | 90.3 | 1.84 | 7.5 | 99.64 |

From these tests it can be concluded that practically 100% reduction of AgCl to metallic silver was achieved. Only a trace of AgCl could be detected in the final melt product. The sum of the metal, Ag+Au+Cu, totalled 99.64%, indicating the complete reduction of all metal chlorides to their metallic forms.

40.7% of the HCl was liberated, the remaining portion being entrapped within the collapsed sinter product. However, this entrapped HCl is released upon melting.

In the test work which was done to prove the viability of the method of the invention the test samples were dried and comminuted. These steps might not always be necessary in order to obtain a reduction efficiency in excess of 99%. For example if copper chloride has previously been removed by leaching a very porous silver chloride product is left and this may have a sufficiently large surface area to enable the comminution step to be dispensed with.

Another factor is that when the product is heated to 400° C. there is complete dissociation of the hydride to silver metal and HCl. This is borne out by the TGA tests in which practically 100% reduction was achieved.

In the large scale test the temperature was raised to 400° C., or 600° C. In this case the elimination of the HCl was not complete, as in the TGA tests, although elimination of the HCl was completed upon subsequent melting.

As the melting point of AgCl is 455° C. it is possible that, in the larger scale tests, the bed melted before all the HCl could be expelled. However if sufficient time is provided with the temperature at 400° C. all the HCl will be expelled and consequently the temperature of 455° C. should not be exceeded before the step of expelling the HCl is completed.

Thus the two process steps of hydriding and dissociating must be fully completed, at the preferred temperatures of about 80° C. and 400° C. respectively, to obtain maximum HCl release and maximum reduction.

The invention claimed is:

1. A method of recovering silver from a particulate mixture which contains a silver chloride comprising the steps of:
    (a) controlling the temperature of the particulate mixture at between 70° C. and 80° C.,
    (b) while controlling the temperature, passing a gas which contains hydrogen through the particulate mixture for a predetermined time period of at least four hours to produce a silver chloride hydride, and
    (c) raising the temperature of the particulate mixture at least to 400° C. to cause the silver chloride hydride to dissociate into silver and to release hydrogen chloride gas.

2. A method according to claim 1 which includes an initial step of drying the mixture at a temperature of up to 100° C. in an atmosphere of the hydrogen-containing gas.

3. A method according to claim 2 wherein the drying is to a dryness of <0,1% $H_2O$ and which includes the step, after drying, of comminuting lumps of a silver salt before carrying out step (b).

4. A method according to claim 1 which includes the step of forming a plurality of gas passages in the particulate mixture to achieve distribution of the hydrogen- containing gas through the mixture during step (b).

5. A method according to claim 1 wherein, in step (c), the temperature is raised to at least 600° C.

6. A mixture according to claim 1 wherein, in step (c), the hydrogen chloride gas is collected in water.

7. A method according to claim 1 wherein the hydrogen-containing gas is H2/N2 of 50%/50% by volume.

8. A method according to claim 1 which is carried out at atmospheric pressure and wherein, in step (c), the temperature is raised incrementally.

* * * * *